US006169162B1

(12) United States Patent
Bush et al.

(10) Patent No.: US 6,169,162 B1
(45) Date of Patent: Jan. 2, 2001

(54) CONTINUOUS POLYAMIDATION PROCESS

(75) Inventors: Gregory E. Bush, Pensacola; Chris E. Schwier, Pensacola Beach; Robert M. Lembcke; Steven W. Cook, both of Pensacola, all of FL (US)

(73) Assignee: Solutia Inc., St. Louis, MO (US)

( * ) Notice: Under 35 U.S.C. 154(b), the term of this patent shall be extended for 0 days.

(21) Appl. No.: 09/317,340

(22) Filed: May 24, 1999

(51) Int. Cl.$^7$ .......................... C08G 69/00; C08G 73/00
(52) U.S. Cl. ..................... 528/310; 528/322; 528/323; 528/324; 528/332; 528/335; 528/336; 528/339; 528/340; 528/347; 528/349
(58) Field of Search ....................... 528/332, 310, 528/322, 323, 324, 335, 336, 339, 340, 347, 349

(56) References Cited

U.S. PATENT DOCUMENTS

| 3,130,180 | 4/1964 | Wiloth ................................. 260/78 |
| 3,329,653 | 7/1967 | Beavers et al. ..................... 260/47 |
| 3,391,232 | 7/1968 | Jackson ................................ 264/40 |
| 3,476,711 | 11/1969 | Muller et al. ......................... 260/78 |
| 3,548,584 | 12/1970 | Silverman et al. ................... 57/140 |
| 3,551,548 | 12/1970 | Brignac et al. ..................... 264/234 |
| 3,562,206 | 2/1971 | Silverman et al. ................ 260/45.7 |
| 3,840,500 | 10/1974 | Ems et al. ............................. 260/78 |
| 4,131,712 | 12/1978 | Sprauer ............................... 528/335 |
| 4,537,949 | 8/1985 | Schmidt et al. .................... 528/335 |
| 4,540,772 | 9/1985 | Pipper et al. ....................... 528/335 |
| 4,758,472 | 7/1988 | Kitamura ............................. 428/364 |
| 4,760,129 | 7/1988 | Haering et al. ..................... 528/481 |
| 4,966,949 | 10/1990 | Weheland ............................ 525/420 |
| 5,073,453 | 12/1991 | Knorr .................................. 428/373 |
| 5,116,919 | 5/1992 | Buzinkai et al. ................... 525/420 |
| 5,128,442 | 7/1992 | Pipper et al. ....................... 528/336 |
| 5,140,098 | 8/1992 | Pipper et al. ....................... 525/420 |
| 5,234,644 | 8/1993 | Schütze et al. ..................... 264/101 |
| 5,250,619 | 10/1993 | Heinz et al. ........................... 525/92 |
| 5,403,910 | 4/1995 | Kosinski et al. ................... 528/336 |
| 5,504,185 | 4/1996 | Toki et al. .......................... 528/336 |
| 5,532,487 | 7/1996 | Brearley et al. ................ 250/339.12 |
| 5,674,974 * | 10/1997 | Brearley et al. ................... 528/347 |

FOREIGN PATENT DOCUMENTS

| 0 373 873 A2 | 6/1990 | (EP) ............................. C08G/69/48 |
| PCT/WO 94/17030 | 8/1994 | (WO) .......................... C07C/231/02 |
| PCT/WO 96/16107 | 5/1996 | (WO) ............................ C08G/69/28 |
| PCT/WO 96/16108 | 5/1996 | (WO) ............................ C08G/69/28 |

OTHER PUBLICATIONS

Abstract of "Melting behavior of polyamide 66 prepared by solid–state polycondensation"by Baishuan Shen, Xiliang Zhang and Xinfa Li. Yingyong Huaxue (1995).

Abstract of "Solid–state polymerization vis–á–vis fiber formation of step–growth polymers. I. Results from a study of nylon 66" by Rangarajah Srinivasan, Prashant Desai and A. S. Abhiraman. Polym. Mater. Sci. Eng. (1994).

Abstract of "Solid–state polyamidation of hexamethylenediammoniumadipate. II. The influence of acid catalysts" by P. V. Katsikopoulos and C. D. Papaspyrides, J. Polym. Sci., Part A: Polym. Chem. (1994).

Abstract of "Solid–state polyamidation processes" by Constantine D. Papaspyrides, Polym. Int. (1992).

Abstract of "Solid State Polyamidation of Aliphatic Diamine Aliphatic Diacid Salts. A Generalised Mechanism for Effect of Polycondensation Water on Reaction Behaviour" by C. D. Papaspyrides, Polymer 31, No. 3, Mar. 1990.

Abstract of "Solid–state polymerization vis–á–vis fiber formation of step–growth polymers. I. Results from a study of nylon 66" by Rangarajan Srinivasan, Prashant Desai, A. S. Abhiraman and Raymond S. Knorr, J. Appl. Polym. Sci. (1994).

Abstract of "Study on the polymerization of nylon. II. Solid polymerization of nylon 66" by Akio Fujimoto, Taketoshi Mori and Shiro Hiruta, Nippon Kagaku Kaishi (1988).

Abstract of "Solid–state polyamidation of hexamethylenediammoniumadipate in the presence of acid catalysts. I. Preparation of the catalyst–containingmonomer." By Constantine D. Papaspyrides, J. Polym. Sci., Part C: Polym. Lett. (1987).

Abstract of "Equipment and methods for the production of high–viscosity polyamides" by S.N. Nurmukhomedov, E. Z. Bokareva, L. I. Sherysheva, V. K. Grishina and N. V. Syrovatskaya, Poliamid. Konstrukts. Materialy,M. (1986).

Abstract of "Solid–state polycondensation of nylon 66 salt" by Hanmin Zeng and Li Feng, Gaofenzi Tongxun (1983).

Abstract of "Dynamic Mechanical Properties of High Molecular Weight Nylon–66 Fibre." By T. Murayama and B. Silverman, J. Polym. Sci. Polym. Phys. Ed. Oct. 1973.

(List continued on next page.)

Primary Examiner—P. Hampton-Hightower
(74) Attorney, Agent, or Firm—Howery Simon Arnold & White, LLP

(57) ABSTRACT

A process for producing a polyamide from dicarboxylic acid monomer and diamine monomer comprises the steps of: (a) mixing molten dicarboxylic acid monomer and molten diamine monomer in equimolar amounts, thereby producing a molten reaction mixture; (b) flowing the reaction mixture through at least one unvented reaction vessel, the residence time of the reaction mixture in the at least one unvented reaction vessel being between about 0.01 minutes and about 30 minutes, thereby forming a first product stream that comprises polyamide and water of polymerization; and (c) flowing the first product stream through at least one vented vessel, whereby water of polymerization is removed, thereby forming a second product stream that comprises polyamide. The process can operate continuously, and there is no need to add water to the dicarboxylic acid, to the diamine, or to the reaction mixture.

43 Claims, 2 Drawing Sheets

OTHER PUBLICATIONS

Abstract of "Catalysts for the solid–phase polycondensation of hexamethylenediammoniumadipate" by E. G. Khripkov, V. M. Kharitonov and G. I. Kudryavtsev, Proizvod. Sin. Volokon (1971).

Abstract of "Solid–phase polycondensation of aromatic polyamides" by Tsuyoshi Kiyotsukuri and Fumihide Otsuki, Kobunshi Kagaku (1972).

Abstract of "Solid–phase polycondensation of hexamethylenediammoniumadipate studied by differential thermal analysis" by E. G. Khripkov, V. N. Kiya–Oglu, V. M. Kharitonov, G. I. Kudryavtsev. Vysokomol. Soedin., Ser. B (1972).

Abstract of "Solid–phase catalytic polycondensation. I. Polycondensation of hexamethylenediammoniumadipate" by E. G. Khripkov, V. M. Kharitonov and G. I. Kudryavtsev, Khim. Volokna (1970).

Abstract of "Thermally induced solid state polycondensation of nylon 66, nylon 6–10 and polyethyleneterephthalate" by Fen Chuan Chen, Richard G. Griskey and G. H. Beyer, AIChE J. (1969).

Abstract of "Nylon 66 polymers. I. Molecular weight and compositional distribution" by John J. Burke and Thomas A. Orofino, J. Polym. Sci. (1969).

Abstract of "Crystalline state extrusion of melt–crystallizedand solution–grown crystals of nylons–6 and 66" by Toshio Shimada and Roger S. Porter, Polymer (1981).

Abstract of "Poly(hexamethyleneadipamide)by melt polymerization" by Paul E. Beck and Eugene E. Magat, Macromol. Syn. (1969).

Patent Abstract: "Polyamides, copolyamides, polyamidopolyureas, or polyester urethanes compatible with occluded aromatic compounds" by Jiri Prochazka and Ludvik Koldovsky, CS 206672 B (1983).

Patent Abstract: "Polyamide Prepn." by(MITC) Mitsui Petrochem Ind. Co. Ltd., JP 03296529 A (1991).

Patent Abstract: "Polyamide prepn" by (MITC) Mitsui Petrochem. Ind. Co. Ltd., JP 03296528 A (1991).

Patent Abstract: "Synthesis of nylon–66 having high polymerisation deg" by (ASAH) Asahi Chem. Ind. Co. Ltd., JP 03167221 A (1991).

Patent Abstract: "Crystalline polyamide resin prepn" by (Furu) Furukawa Electric Co. Ltd., JP 60190425 A (1985).

Patent Abstract: "Recondensation of polyamide 6,6 granules" by L. Berger, H. Stehr and N. Zemp, CH 686308 A5 (1996).

Patent Abstract: "Prodn. and processing of high–mol.wt. polyamide(s)" by F. Fahnler, H. D. Heinz, N. Pamin, H. Schulte and H. Heinz, DE 4100913 A (1992).

Patent Abstract: "High–mol.wt. polyamide(s)" by F. Fahnler, H. D. Heinz, H. Schulte and H. Heinz, DE 4100912 A (1992).

Patent Abstract: "Increasing viscosity of (co) polyamides" by (CHEM) Chem Werke Huels Ag., DE 2458733 A (1975).

Patent Abstract: "High mol wt polyamides having high affinity for acid dyestuffs"by (RHOD) Soc Rhodiatoce Spa., FR 2060568 A (1971).

Patent Abstract: "Polyamide resins mfr. for engineering plastics" by (SHOW) Showa Denko KK, JP 06192416 A (1994).

Patent Abstract: "Crystalline polyamide resin for moulding thin wall parts" by (ASAH) Asahi Kasei Kogyo KK, JP 06116393 A (1994).

Patent Abstract: "Poly hexa methylene adipamide with restricted three–dimensionalstructure" by (ASAH) Asahi Chem. Ind. Co. Ltd., JP 04093323 A (1992).

Patent Abstract: "Preparation of high–molecular–weight poly(hexamethyleneadipamide)" by Katsuya Shimizu and Fumiakilse, JP 04093323 A2 (1992).

Patent Abstract: "Solid–phase polymerisation of polyamide" by (ASAH) Asahi Chem. Ind. Co. Ltd., JP 03275720 A (1991).

Patent Abstract: "Stable continuous mfr. of nylon 66 for cars, household and business" by (TORA) Toray Ind. Inc., JP 05230208 A (1993).

Patent Abstract: "Less–branchedpoly hexa methylene adipamide of good spinnability" by (ASAH) Asahi Chem. Ind. Co. Ltd., JP 03290432 A (1991).

Patent Abstract: "Polyamide multifilamentmfr., for tyre cord" by (ASAH) Asahi Chem. Ind. Co. Ltd., JP 03014615 A (1991).

Patent Abstract: "Ultrahigh mol. Wt. Poly hexa methylene adipamide" by (ASAH) Asahi Chem. Ind. Co. Ltd., JP 01284525 A (1989).

Patent Abstract: "Preparation of ultrahigh–molecularweight nylon 66" by Asahi Chemical Industry Co., Ltd., JP 01284525 A2 (1989).

Patent Abstract: "Solid phase polymn of polyamide" by (ASAH) Asahi Chem. Ind. Co. Ltd., JP 48023199 B (1973).

Patent Abstract: "Polyamides prodn" by (ASAH) Asahi Chem. Ind. Co. Ltd., JP 48023197 B (1973).

Patent Abstract: "Polyamide resin prepn." By (MITC) Mitsui Petrochem Ind. Co. Ltd., JP 04170430 A (1992).

Patent Abstract: "Polyamide prepn. for fibre" by (MITC) Mitsui Petrochem Ind. Co. Ltd., JP 04008730 A (1992).

Patent Abstract: "Co–polyamide mfr. with specific high m. pt. polymerisation deg. Etc." by (MITC) Mitsui Petrochem Ind. Co. Ltd., JP 03043417 A (1991).

Patent Abstract: "Polycondensates of increased mol. w. used e.g. for foams" by H. Herbst, K. Hoffmann and R. Pfaendner, WO 9611978 A1 (1996).

Patent Abstract: "Increasing the molecular weight of a polycondensate by mixing with a hydroxyphenylphosphonate and heating in the solid state" by Rudolf Pfaender, Kurt Hoffmann and Heinz Herbst, WO 9611978 A1 (1996).

Patent Abstract: "Polyhexamethylenediamide prepn" by (KRH–I) Khripkov EG Kharitonov VM, SU 314775 A (1972).

Patent Abstract: "High–molecular–eightpoly(hexamethyleneadipamide)"by E. G. Khripkov, V. M. Kharitonov and G. I. Kudryavtsev, SU 314775 (1971).

* cited by examiner

CONTINUOUS POLYAMIDATION PROCESS

BACKGROUND OF THE INVENTION

The present invention relates generally to processes for producing polyamides from dicarboxylic acid monomers and diamine monomers. More particularly, the invention relates to a process for producing polyamides that does not require the addition of water to the reactants.

Polyamides can be produced by a two-step process in which a dicarboxylic acid and a diamine are reacted in water to form a salt, and then the salt is heated to cause polymerization. For example, adipic acid and hexamethylenediamine can be used to form nylon 6,6. The water liberated by the polymerization as well as the water added with the reactants must eventually be removed from the product, for example by evaporation. This requires major amount of energy as well as additional process equipment. Therefore, it would be useful to produce polyamides without adding water to the reactants, in order to reduce the expense of removing water from the product, and in order to eliminate the intermediate (salt) product, thereby simplifying the overall process.

However, attempts to produce polyamides directly from the monomers without adding water have encountered a number of problems. Regulating the amounts of the monomers fed to the reaction is critical, because an excess of one or the other will adversely affect the molecular weight and thus the physical properties of the product. It has proven to be quite difficult to provide the precise regulation of reactant amounts that is required. Other problems with such direct polymerization processes include degradation of the monomers and/or the polymer product as a result of (1) being kept at high temperatures for lengthy periods of time (e.g., several hours), (2) contact of the molten monomers with oxygen, and (3) exposure to trace metal impurities in the materials from which the process equipment is made.

There is a long-standing need for improved processes for making polyamides directly from monomers.

SUMMARY OF THE INVENTION

One aspect of the invention is a process for producing a polyamide from dicarboxylic acid monomer and diamine monomer. One embodiment of the process includes the steps of:

(a) mixing molten dicarboxylic acid monomer and molten diamine monomer in equimolar amounts, thereby producing a molten reaction mixture;

(b) flowing the reaction mixture through at least one unvented reaction vessel, the residence time of the reaction mixture in the at least one unvented reaction vessel being between about 0.01 minutes and about 30 minutes, thereby forming a first product stream that comprises polyamide and water of polymerization; and (c) flowing the first product stream through at least one vented vessel, whereby water of polymerization is removed, thereby forming a second product stream that comprises polyamide.

In another embodiment, the process includes the steps of:

(a) mixing molten dicarboxylic acid monomer and molten diamine monomer in equimolar amounts, thereby producing a molten reaction mixture; and (b) flowing the reaction mixture through at least one unvented reaction vessel at a pressure between 0–500 psig, the residence time of the reaction mixture in the at least one unvented reaction vessel being between about 0.01 minutes and about 30 minutes, thereby forming a first product stream that comprises polyamide.

In this embodiment of the process, a second vessel, located downstream of the at least one unvented reaction vessel, is not required, but may optionally be used, for removal of water of polymerization, for further reaction, or for both purposes.

This process of the present invention can operate continuously, and there is no need to add water to the dicarboxylic acid, to the diamine, or to the reaction mixture. No additional dicarboxylic acid monomer or diamine monomer needs to be added after the mixing.

The molten dicarboxylic acid can be produced by the steps of:

removing oxygen from dry dicarboxylic acid by alternately subjecting the dry dicarboxylic acid in an oxygen removal pressure vessel to a vacuum and to inert gas pressure, thereby producing solid dicarboxylic acid that has reduced molecular oxygen content; and feeding the solid dicarboxylic acid having reduced molecular oxygen content to a melter vessel which contains a quantity of molten dicarboxylic acid, whereby the solid dicarboxylic acid melts and a continuous stream of molten dicarboxylic acid is produced.

The solid dicarboxylic acid can be moved from the oxygen removal pressure vessel to the melter vessel by gravity. Preferably it is moved from the oxygen removal pressure vessel to the melter vessel by a combination of gravity and inert gas pressure in the oxygen removal pressure vessel. This arrangement permits the residence time of the dicarboxylic acid monomer in the melter vessel to be less than three hours.

In preferred embodiments of the process, the temperature of the reaction mixture in the at least one unvented reaction vessel is between about 220 and about 300° C. Preferably the pressure in the at least one unvented reaction vessel is between about 0–500 psig, more preferably between about 50–250 psig, most preferably between about 120–180 psig. The residence time of the reaction mixture in the at least one unvented reaction vessel is preferably between about 0.01 minutes and about 30 minutes, more preferably between about 0.5–30 minutes, most preferably between about 1–5 minutes. The first product stream exiting the at least one unvented reaction vessel typically contains less than 40% by weight unpolymerized monomers, preferably less than 10% by weight unpolymerized monomers. The residence time of the reaction mixture in the at least one vented reaction vessel is preferably from about 1 minute to about 60 minutes.

In one embodiment of the invention, a reactive diamine recovery system can be used. The at least one vented reaction vessel generates an offgas stream that comprises water vapor and vaporized diamine monomer, and the offgas is contacted with molten dicarboxylic acid monomer in a recovery column, whereby at least a portion of the vaporized diamine monomer reacts with the dicarboxylic acid monomer to form polyamide. A liquid effluent stream is generated from the recovery column that comprises polyamide and unreacted molten dicarboxylic acid monomer, and the liquid effluent stream is subsequently mixed with molten diamine monomer.

One specific embodiment of the invention is a continuous process for making nylon 6,6 from adipic acid and hexamethylenediamine (HMD), comprising:

removing oxygen from dry adipic acid by alternately subjecting the dry acid in an oxygen removal pressure vessel to a vacuum and to inert gas pressure, thereby producing solid adipic acid that has reduced molecular oxygen content;

feeding the solid adipic acid having reduced molecular oxygen content to a melter vessel which contains a quantity of molten adipic acid, whereby the solid adipic acid melts and a continuous stream of molten adipic acid is produced;

melting HMD;

mixing molten adipic acid and molten HMD in equimolar amounts, thereby creating a reaction mixture;

flowing the reaction mixture through at least one unvented reaction vessel, the residence time of the reaction mixture in the at least one unvented reaction vessel being between about 0.01 to about 5 minutes, thereby forming a partially polymerized nylon 6,6 reaction mixture;

flowing the partially polymerized reaction mixture through at least one vented reaction vessel, whereby the partially polymerized reaction mixture is further polymerized, producing nylon 6,6, and wherein water of polymerization is removed.

In this specific embodiment, the relative viscosity (RV) of the partially polymerized nylon 6,6 reaction mixture exiting the unvented reaction vessel is between about 0 and about 3, and the relative viscosity of the nylon 6,6 exiting the vented vessel is between about 3 and about 15. Relative viscosity as used herein is the ratio of viscosity (in centipoises) at 25° C. of 8.4% by weight solution of polyamide in 90% formic acid (90% by weight formic acid and 10% by weight water) to the viscosity (in centipoises) at 25° C. of 90% formic acid alone.

The polyamidation process of the present invention can produce its end product without the need to add water to the reactants, and without the intermediate step of forming a salt. In addition, the process of the present invention can operate continuously and with much shorter residence times for the molten reactants and molten polymer in the high temperature portions of the process. This significantly reduces the water usage, waste water production, and energy consumption of the process. This also eliminates the need for or reduces the required size of some process equipment found in prior art processes, such as evaporators that have been used to remove the added process water. Further, excessive thermal exposure of the reactants and product is avoided.

The aspect of the present invention relating to a reactive recovery column for recovery and re-use of hexamethylenediamine or other diamine monomer reduces diamine emissions in waste streams, and increases the overall conversion of diamine feed to polyamide product.

The aspect of the present invention relating to continuous melting of dicarboxylic acid, such as adipic acid, provides a practical and economical method of continuously supplying molten dicarboxylic acid for use in a polyamidation process or for other uses. The process provides high quality molten acid without discoloration or other thermal degradation. The production of clear molten acid facilitates the production of high quality polyamide.

DESCRIPTION OF ILLUSTRATIVE EMBODIMENTS

The process of the present invention can be used to produce a variety of polyamides from diacid and diamine monomers. The process is particularly useful for producing nylon 6,6 from adipic acid and hexamethylenediamine.

Figure 1:
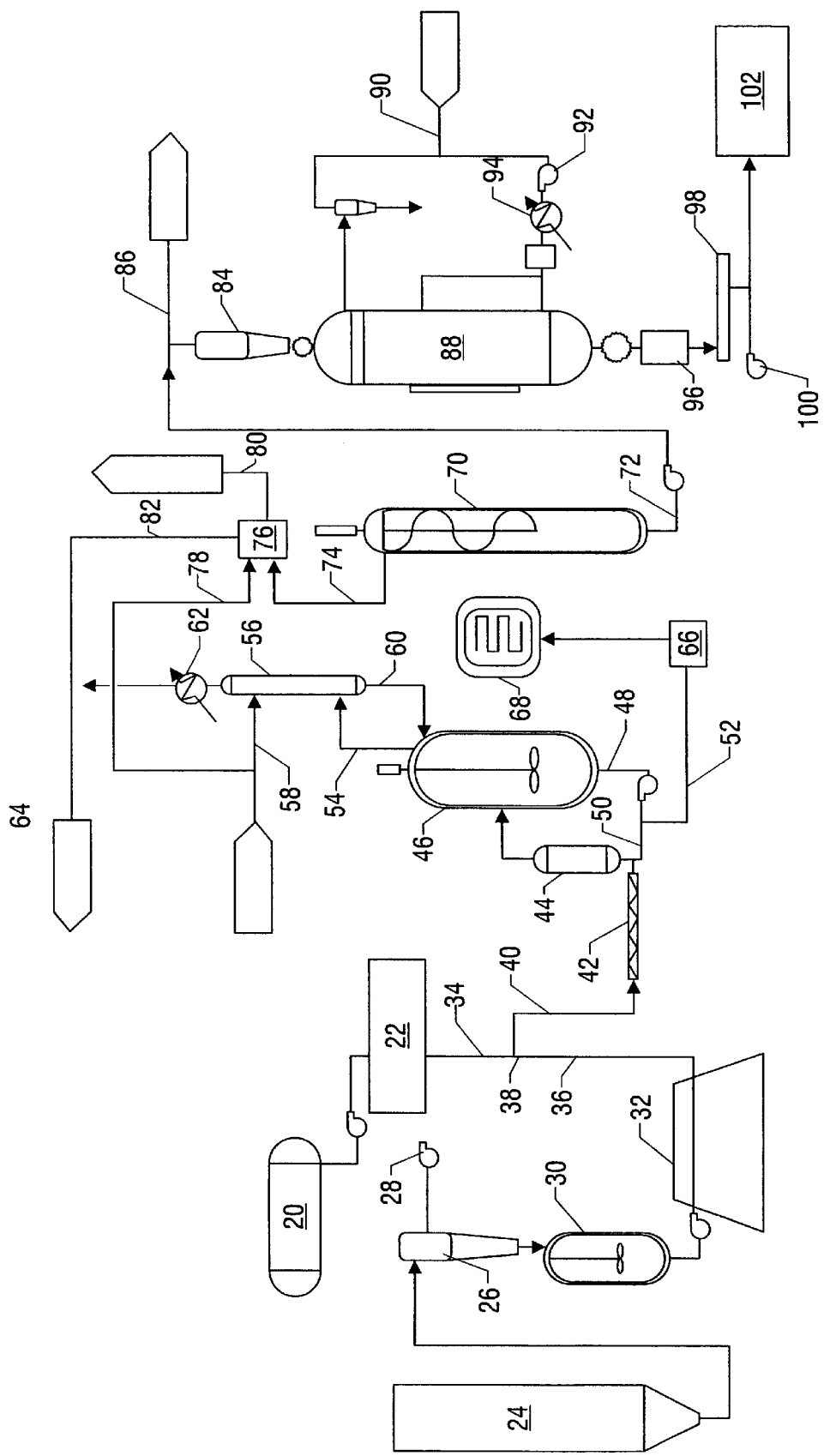
FIG. 1 is a process flow diagram for a polyamidation process of the present invention.

FIG. 1 shows a process flow diagram for one embodiment of the process. Molten hexamethylenediamine (HMD) is provided from a molten HMD storage tank 20. There are several suitable ways of providing the molten HMD. One is to locate the polyamidation process equipment adjacent to a plant where HMD is produced, so that a HMD stream can be piped directly to the tank 20. Another way would be to provide an aqueous HMD solution, evaporate the water, and melt the HMD.

Heat optionally can be applied in this tank 20, for example by means of a heat transfer jacket around the tank 20. The temperature in this tank is preferably about 70° C. The molten HMD is then pumped through an HMD metering system 22 which precisely controls the amount of HMD fed to the downstream apparatus.

Adipic acid, typically in the form of dry crystals, is supplied from an adipic acid storage silo 24. Adipic acid from the silo flows to a bulk oxygen eliminator tank 26. In this tank 26, air is removed. Preferably, removal of air in the tank 26 is accomplished by cycling vacuum with nitrogen displacement in batch mode. The vacuum can be induced by means of a vacuum pump 28. The frequency of cycling between vacuum and nitrogen pressure can be adjusted to achieve the desired level of oxygen removal.

Preferably the bulk oxygen eliminator tank 26 comprises a pressure vessel having a bottom portion forming a hopper with a diminishing diameter towards its bottom. The sides of the hopper portion of the bulk oxygen eliminator tank preferably form an angle with the horizontal of at least 70° in order to facilitate flow out of the bottom of the tank.

The adipic acid crystals, largely free of molecular oxygen, then flow (preferably by gravity, with a pressure assist by the nitrogen pressure in the bulk oxygen eliminator tank) from the bulk oxygen eliminator tank 26 to an adipic acid melter vessel 30. The melter vessel 30 preferably is a continuously stirred jacketed vessel that operates slightly pressurized with nitrogen at a temperature slightly above the adipic acid melt point (i.e., above 153° C.). Adipic acid crystals entering this vessel through its top are quickly melted at the surface of the molten adipic acid therein. Thus the process can continuously melt adipic acid. Preferably the melter vessel 30 has a reversed conical entry nozzle to reduce flow resistance. It is also preferred that the melter vessel 30 be made of a metal alloy containing little or no impurities that would adversely affect the molten monomer. Hastolloy C and 316 stainless steel are suitable materials.

It may be useful to include additional measures for further oxygen removal from this melter vessel, to minimize the potential for thermal degradation. One way of doing this is to supply vibrational energy to the molten adipic acid in the melter vessel 30, for example by means of an ultrasonic device. The vibrational energy can facilitate the escape of entrained air from the molten acid, causing air bubbles to rise to the surface of the molten acid.

The residence time of the molten adipic acid in the melter vessel 30 preferably is minimized to reduce the thermal exposure of that reactant. Preferably the residence time is less than three hours, more preferably between about 1–2 hours. The molten adipic acid exits the bottom of the melter vessel 30 and is pumped to a molten adipic acid metering system 32 which precisely controls the amount of adipic acid fed to the downstream apparatus.

The combination of the bulk oxygen eliminator tank 26 and the adipic acid melter vessel 30 permits the continuous melting of adipic acid crystals without thermal degradation or discoloration.

The molten HMD stream 34 from the HMD metering system 22 and the molten adipic acid stream 36 from the adipic acid metering system 32 are continuously contacted and combined in stoichiometric amounts in a Y-junction 38. The two monomers contact each other as they pass from the Y-junction through the next segment 40 of piping and into an unvented mixer 42, which is preferably an inline static mixer.

In a preferred embodiment of the process, the molten adipic acid stream 36 is at a temperature of about 170° C. and the molten HMD stream 34 is at about 70° C., and the pressure at the Y-junction 38 is about 150 psig. The inline static mixer is preferably a Kenics static mixer with 24 elements. The walls of the Y-junction and the inline mixer 42 are preferably kept at about 268° C. The residence time of the monomers in the mixer 42 is preferably between about 1–30 seconds, more preferably about 3 seconds. The reaction mass leaving the mixer 42 passes into an unvented pipe, allowing for example an additional 10–60 seconds of reaction time at 260° C. and 150 psig.

Although the process of the present invention can operate without the inclusion of water in the reactants, it is not required that the reactants be entirely anhydrous. For example, the HMD feed stream could contain as much as about 5% water by weight, and the adipic acid stream could contain as much as about 2% water by weight, and the should still function properly. Reactant streams having such low concentrations of water are referred to herein as "essentially dry."

Some reaction of the HMD and adipic acid occurs from the time they contact each other at the Y-junction 38 continuing through the time they enter the heat exchanger 44. The temperature and residence time employed in this portion of the process can be selected to cause complete polymerization by this point, or to prevent compete polymerization from occurring by this point. In the latter situation, the partial reaction product generated by the contacting of the monomers is referred to herein as the "prepolymer." The prepolymer mass in the pipe downstream of the mixer 42 will typically be 60–90% converted to nylon 6,6. No plugging should occur because the conditions employed prevent crystallization of low melting intermediates. It is important to optimum operation of the process that the piping 40 and mixer 42 be unvented, and that the pressure therein be relatively low, for example between about 0–500 psig, most preferably about 150 psig.

In the embodiment of the process shown in FIG. 1, the prepolymer next passes through a heat exchanger 44 and into a vented prepolymer reactor 46. It is not critical that a heat exchanger be used here. Any required heat could instead be provided by internal heating coils within the reactor 46, or by jacket around the reactor. The heated prepolymer exiting the heat exchanger 44 preferably enters the reactor 46 at a point below the surface of the liquid material therein. Further polymerization can occur in this reactor 46, which is preferably a continuously stirred tank reactor. The reactor bottoms stream 48 optionally can be split into a recycle stream 50 and a second stream 52 that is routed for further processing. If recycle is used, the recycle stream 50 flowrate is preferably at least 15 times larger than the flowrate of fresh prepolymer feed to the reactor 46. The reactor 46 is preferably operated about 50% full of liquid material in order to provide a large vapor/liquid disengagement surface.

It is highly desirable in this process to provide backmixing of polymer endgroups, high surface area interface generation which facilitates devolitilization of the molten material, and high heat transfer rates which can rapidly increase the temperature of the melted material. These advantages can be achieved, for example, either by use of a continuously stirred tank reactor, or by use of a plug flow reactor together with recycle of the product stream.

The overhead stream 54 from the reactor 46 is vapor including steam (i.e., vaporized water produced by the polycondensation reaction) and typically some HMD. The overhead 54 passes into an HMD recovery column 56, into which is also fed water 58. Condensate stream 60, containing some HMD and water, is recycled to the reactor 46, while the remaining vapor is cooled by a heat exchanger 62 and removed as part of an offgas stream 64.

In one embodiment of the process, the prepolymer is heated to about 260° C. in the heat exchanger 44, and the reactor 46 operates at about 260° C. and 150 psig. As an example of suitable relative flowrates, if the fresh prepolymer is fed to the reactor 46 at a rate of 100 lbs. per hour, the reactor bottoms recycle flowrate is preferably about 2,000 lbs. per hour. A reactor 46 operated under these conditions can yield greater than 95% conversion of monomers to nylon 6,6 with a three weight percent water concentration after 20 min. residence time in the reactor 46.

The partially polymerized material in the stream 52 leaving the reactor 46 is analyzed, for example by a near-infrared (NIR) device 66. The device can determine, for example by near-infrared spectroscopy, the relative amount of amine and acid endgroups. The measurements by the NIR device 66 can be used to control the HMD metering system 22 and/or the adipic acid metering system 32.

Although the material at this point in the process is polymerized, in some embodiments of the process the extent of the polymerization, and therefore the molecular weight and relative viscosity (RV) of the polymer, will not be as high as is desired for the final product. Therefore, the partially polymerized material can be passed through a flasher 68 to supply additional heat, and then into a second reactor 70. The purpose of the second reactor 70 is to permit further polymerization and thus to increase the molecular weight and RV of the product. The polymer product in the bottoms stream 72 from the second reactor should have the desired molecular weight for the end product.

Preferably the temperature in the second reactor 70 is between about 260 and about 280° C., and the pressure is atmospheric.

HMD vapor and steam generated in the second reactor 70 are removed in an overhead stream 74 which enters a scrubber 76. A water stream 78 is also fed to this scrubber, so that the steam will be condensed and can be removed as a sewer water stream 80. Remaining vapor leaves the scrubber 76 in an overhead stream 82 and becomes part of the offgas stream 64.

The polymer product can either be sent through a pelletizer 84 or routed through a bypass line 86. If it is run through the pelletizer, the polymer pellets are then passed into a dryer 88. A nitrogen gas feed 90, a nitrogen blower 92, and a nitrogen heater 94 are used to supply nitrogen gas to the vessel 88, which dries the polymer pellets. The dried pellets passing out the bottom of the dryer 88 pass through a water spray cooler 96, a screener 98, and are moved by a blower 100 to a product storage area 102.

Figure 2:
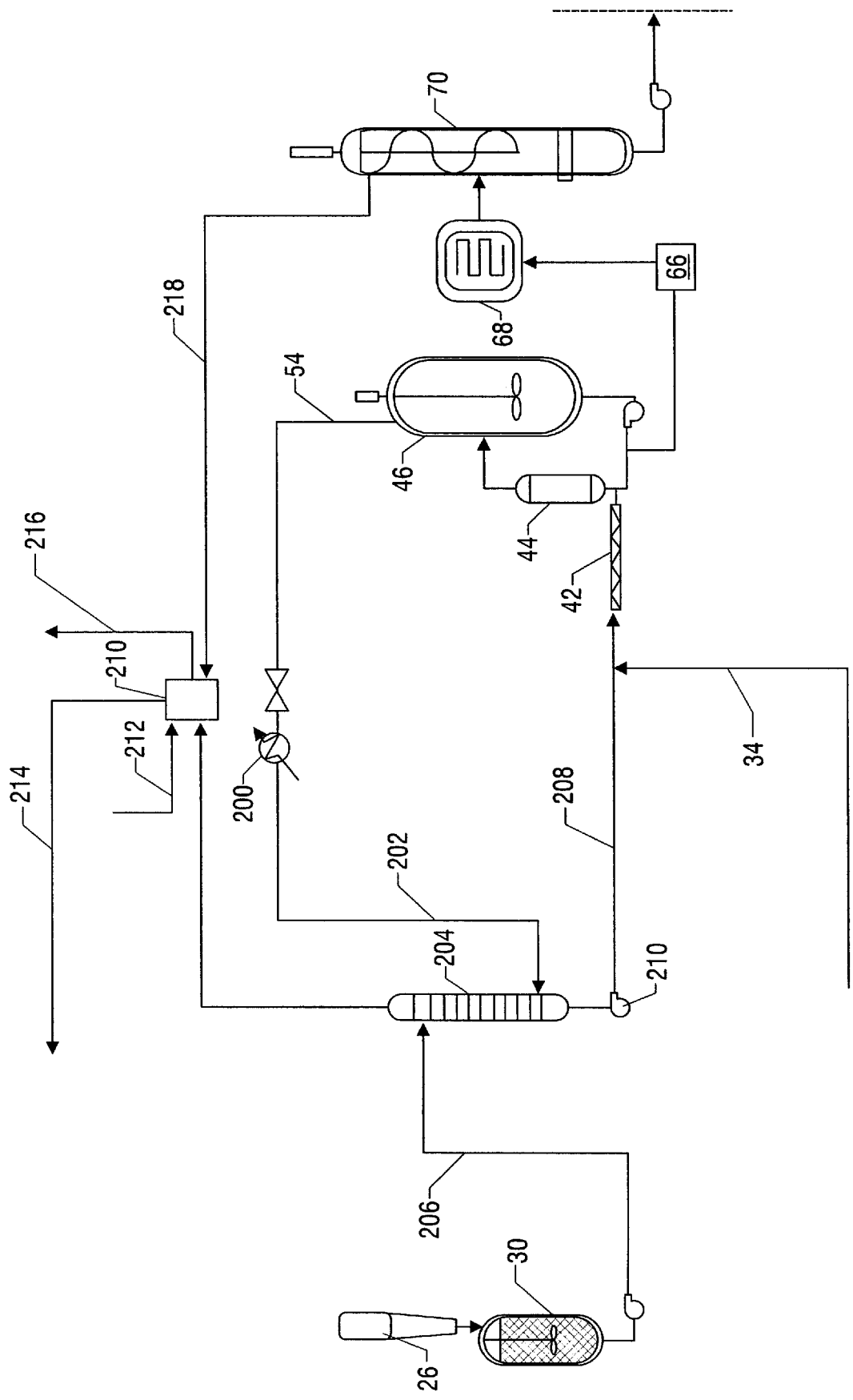
FIG. 2 is a process flow diagram for a reactive diamine recovery system that can be used in a polyamidation process of the present invention.

Referring again to FIG. 1, the HMD in the offgas 54 from the reactor 46 can be removed by conventional separation in a sieve tray column 56. Alternatively, the HMD can be recovered using a reactive column as shown in FIG. 2. In this alternative embodiment, the offgas 54 from the reactor 46 is vented through a heat exchanger 200 in which it is superheated to 260° C. and 10 psig. The superheated offgas 202 is injected in the lower region of a reactive HMD recovery column 204. A molten adipic acid stream 206 (preferably at about 170° C.) is fed to the upper region of the column 204, which preferably is maintained at about 182° C. and about 8 psig. The molten adipic acid reacts with the HMD in the offgas, producing small quantities of nylon salt, while being heated to 182° C. The effluent stream 208 from the column 204 is pumped to the in-line static mixer 42, with the pump 210 preferably increasing the effluent pressure to about 200 psig. Of course molten HMD stream 34 is also fed to the mixer 42.

The offgas from the top of the reactive HMD recovery column 204 is then fed to a scrubber 210, where it is scrubbed by a water stream 212, resulting in a final offgas stream 214 and a sewer water stream 216. The offgas stream 218 from the second reactor 70 can also be fed to the scrubber 210.

The use of a reactive HMD recovery column 204 as shown in FIG. 2 can lower total water usage in the process, by eliminating external water reflux to the reactor.

The polyamides produced by the process such as nylon 6,6 have a number of well-known uses, such as being formed into fibers for carpet.

The preceding description of specific embodiments of the present invention is not intended to be a complete list of every possible embodiment of the invention. Persons skilled in this field will recognize that modifications can be made to the specific embodiments described here that would be within the scope of the present invention. For example, although the detailed embodiments described herein react adipic acid and hexamethylenediamine to produce nylon 6,6, other monomers known to those skilled in this field could be used to produce other polyamides.

What is claimed is:

1. A process for producing a polyamide from dicarboxylic acid monomer and diamine monomer, comprising:
   mixing molten dicarboxylic acid monomer and molten diamine monomer in equimolar amounts, thereby producing a molten reaction mixture;
   flowing the reaction mixture through at least one unvented reaction vessel wherein the temperature is between about 220 and 300° C., the residence time of the reaction mixture in the at least one unvented reaction vessel being between about 0.01 minutes and about 30 minutes, thereby forming a first product stream that comprises polyamide and water of polymerization; and
   flowing the first product stream through at least one vented vessel, whereby water of polymerization is removed, thereby forming a second product stream that comprises polyamide.

2. The process of claim 1, wherein the first product stream further comprises unpolymerized dicarboxylic acid monomer and diamine monomer, and wherein further polymerization occurs in the at least one vented vessel.

3. The process of claim 1, wherein the molten dicarboxylic acid and the molten diamine are essentially dry.

4. The process of claim 1, wherein no additional dicarboxylic acid monomer or diamine monomer are added after the mixing of the molten dicarboxylic acid and the molten diamine.

5. The process of claim 1, wherein the pressure in the at least one unvented reaction vessel is between about 0–500 psig.

6. The process of claim 5, wherein the pressure in the at least one unvented reaction vessel is between about 50–250 psig.

7. The process of claim 5, wherein the pressure in the at least one unvented reaction vessel is between about 120–180 psig.

8. The process of claim 1, wherein the residence time of the first product stream in the at least one vented vessel is between about 1 minute and about 60 minutes.

9. The process of claim 1, wherein a portion of the second product stream is recycled in or to the at least one vented reaction vessel.

10. The process of claim 1, wherein the dicarboxylic acid monomer is adipic acid, the diamine monomer is hexamethylenediamine, and the polyamide is nylon 6,6.

11. A process for producing a polyamide from dicarboxylic acid monomer and diamine monomer, comprising:
    removing oxygen from dry dicarboxylic acid by alternately subjecting essentially dry dicarboxylic acid in an oxygen removal pressure vessel to a vacuum and to inert gas pressure, thereby producing solid dicarboxylic acid that has reduced molecular oxygen content; and
    feeding the solid dicarboxylic acid having reduced molecular oxygen content to a melter vessel which contains a quantity of molten dicarboxylic acid, whereby the solid dicarboxylic acid melts and a continuous stream of molten dicarboxylic acid is produced;
    mixing molten dicarboxylic acid monomer and molten diamine monomer in equimolar amounts, thereby producing a molten reaction mixture;
    flowing the reaction mixture through at least one unvented reaction vessel, the residence time of the reaction mixture in the at least one unvented reaction vessel being between about 0.01 minutes and about 30 minutes, thereby forming a first product stream that comprises polyamide and water of polymerization; and
    flowing the first product stream through at least one vented vessel, whereby water of polymerization is removed, thereby forming a second product stream that comprises polyamide.

12. The process of claim 11, wherein the solid dicarboxylic acid is moved from the oxygen removal pressure vessel to the melter vessel by gravity.

13. The process of claim 11, wherein the solid dicarboxylic acid is moved from the oxygen removal pressure vessel to the melter vessel by a combination of gravity and inert gas pressure in the oxygen removal pressure vessel.

14. The process of claim 11, wherein the residence time of the dicarboxylic acid monomer in the melter vessel is less than three hours.

15. The process of claim 1, wherein the at least one unvented reaction vessel comprises a static inline mixer.

16. The process of claim 15, wherein the residence time of the reaction mixture in the static inline mixer is between about 1–30 seconds.

17. The process of claim 1, wherein the first product stream exiting the at least one unvented reaction vessel contains less than 40% by weight unpolymerized monomers.

18. The process of claim 1, wherein the first product stream exiting the at least one unvented reaction vessel contains less than 10% by weight unpolymerized monomers.

19. The process of claim 1, wherein the at least one vented reaction vessel generates an offgas stream that comprises water vapor and vaporized diamine monomer, and wherein the offgas is contacted with molten dicarboxylic acid monomer in a recovery column, whereby at least a portion of the vaporized diamine monomer reacts with the dicarboxylic acid monomer to form polyamide, and wherein a liquid effluent stream is generated from the recovery column that comprises polyamide and unreacted molten dicarboxylic acid monomer, and wherein the liquid effluent stream is subsequently mixed with molten diamine monomer.

20. A process for producing a polyamide from dicarboxylic acid monomer and diamine monomer, comprising:

mixing essentially dry molten dicarboxylic acid monomer and essentially dry molten diamine monomer in equimolar amounts, thereby producing a molten reaction mixture; and flowing the reaction mixture through at least one unvented reaction vessel at a pressure between 0–500 psig, the residence time of the reaction mixture in the at least one unvented reaction vessel being between about 0.01 minutes and about 30 minutes, thereby forming a first product stream that comprises polyamide.

21. The process of claim 20, wherein no additional dicarboxylic acid monomer or diamine monomer are added after the mixing of the molten dicarboxylic acid and the molten diamine.

22. The process of claim 20, wherein the temperature of the reaction mixture in the at least one unvented reaction vessel is between about 220 and about 300° C.

23. The process of claim 20, wherein the pressure in the at least one unvented reaction vessel is between about 50–250 psig.

24. The process of claim 23, wherein the pressure in the at least one unvented reaction vessel is between about 120–180 psig.

25. The process of claim 20, wherein the dicarboxylic acid monomer is adipic acid, the diamine monomer is hexamethylenediamine, and the polyamide is nylon 6,6.

26. The process of claim 20, wherein the molten dicarboxylic acid monomer is produced by:

removing oxygen from dry dicarboxylic acid by alternately subjecting essentially dry dicarboxylic acid in an oxygen removal pressure vessel to a vacuum and to inert gas pressure, thereby producing solid dicarboxylic acid that has reduced molecular oxygen content; and feeding the solid dicarboxylic acid having reduced molecular oxygen content to a melter vessel which contains a quantity of molten dicarboxylic acid, whereby the solid dicarboxylic acid melts and a continuous stream of molten dicarboxylic acid is produced.

27. The process of claim 26, wherein the solid dicarboxylic acid is moved from the oxygen removal pressure vessel to the melter vessel by gravity.

28. The process of claim 26, wherein the solid dicarboxylic acid is moved from the oxygen removal pressure vessel to the melter vessel by a combination of gravity and inert gas pressure in the oxygen removal pressure vessel.

29. The process of claim 26, wherein the residence time of the dicarboxylic acid monomer in the melter vessel is less than three hours.

30. The process of claim 20, wherein the at least one unvented reaction vessel comprises a static inline mixer.

31. The process of claim 30, wherein the residence time of the reaction mixture in the static inline mixer is between about 1–30 seconds.

32. A process for continuous melting of a dicarboxylic acid, comprising:

removing oxygen from dry dicarboxylic acid by alternately subjecting the dry dicarboxylic acid in an oxygen removal pressure vessel to a vacuum and to inert gas pressure, thereby producing solid dicarboxylic acid that has reduced molecular oxygen content; and feeding the solid dicarboxylic acid having reduced molecular oxygen content to a melter vessel which contains a quantity of molten dicarboxylic acid, whereby the solid dicarboxylic acid melts and a continuous stream of molten dicarboxylic acid is produced.

33. A continuous process for making nylon 6,6 from adipic acid and hexamethylenediamine (HMD), comprising:

removing oxygen from dry adipic acid by alternately subjecting the dry acid in an oxygen removal pressure vessel to a vacuum and to inert gas pressure, thereby producing solid adipic acid that has reduced molecular oxygen content;

feeding the solid adipic acid having reduced molecular oxygen content to a melter vessel which contains a quantity of molten adipic acid, whereby the solid adipic acid melts and a continuous stream of molten adipic acid is produced;

melting HMD;

mixing molten adipic acid and molten HMD in equimolar amounts, thereby creating a reaction mixture;

flowing the reaction mixture through at least one unvented reaction vessel, the residence time of the reaction mixture in the at least one unvented reaction vessel being between about 0.01 to about 5 minutes, thereby forming a partially polymerized nylon 6,6 reaction mixture; and flowing the partially polymerized reaction mixture through at least one vented reaction vessel, whereby the partially polymerized reaction mixture is further polymerized, producing nylon 6,6, and wherein water of polymerization is removed.

34. The process of claim 33, wherein the at least one vented reaction vessel generates an offgas stream that comprises water vapor and vaporized HMD, and wherein the offgas is contacted with molten adipic acid in a recovery column, whereby at least a portion of the vaporized HMD reacts with the adipic acid to form nylon 6,6, and wherein a liquid effluent stream is generated from the recovery column that comprises nylon 6,6 and unreacted molten adipic acid, and wherein the liquid effluent stream is subsequently mixed with molten HMD.

35. The process of claim 33, wherein the relative viscosity of the partially polymerized nylon 6,6 reaction mixture exiting the unvented reaction vessel is between about 0 and about 3, and the relative viscosity of the nylon 6,6 exiting the vented reaction vessel is between about 3 and about 15.

36. The process of claim 11, wherein the dicarboxylic acid monomer is adipic acid, the diamine monomer is hexamethylenediamine, and the polyamide is nylon 6,6.

37. The process of claim 11, wherein the first product stream exiting the at least one unvented reaction vessel contains less than 40% by weight unpolymerized monomers.

38. A process for producing a polyamide from dicarboxylic acid monomer and diamine monomer, comprising:

mixing molten dicarboxylic acid monomer and molten diamine monomer in equimolar amounts, thereby producing a molten reaction mixture; and flowing the reaction mixture through at least one reaction vessel wherein the temperature is between about 220 and 300° C., thereby forming a first product stream that comprises polyamide and water of polymerization.

39. The process of claim 38, wherein the dicarboxylic acid monomer is adipic acid, the diamine monomer is hexamethylenedialmine, and the polyamide is nylon 6,6.

40. The process of claim 38, wherein the at least one reaction vessel comprises a static inline mixer.

41. A process for producing polyamide from dicarboxylic acid monomer and diamine monomer, comprising:

mixing essentially dry molten dicarboxylic acid monomer and essentially dry molten diamine monomer to produce a molten reaction mixture; and flowing the reaction mixture through at least one reaction vessel wherein the temperature is between about 220 and 300° C., thereby forming a first product stream that comprises polyamide and water of polymerization.

42. The process of claim 41, wherein the dicarbolylic acid monomer is adipic acid, the diamine monomer is hexamethylenediamine, and the polyamide is nylon 6,6.

43. The process of claim 42, wherein the at least one reaction vessel comprises a static inline mixer.

* * * * *

UNITED STATES PATENT AND TRADEMARK OFFICE
CERTIFICATE OF CORRECTION

PATENT NO. : 6,169,162 B1
DATED : January 2, 2001
INVENTOR(S) : Bush et al.

Page 1 of 1

It is certified that error appears in the above-identified patent and that said Letters Patent is hereby corrected as shown below:

Column 4,
Line 8, please insert the word -- molten -- between a *and* HMD stream;

Column 5,
Line 30, please insert the word -- process -- before the word should

Signed and Sealed this

Thirteenth Day of November, 2001

Attest:

NICHOLAS P. GODICI
Attesting Officer
Acting Director of the United States Patent and Trademark Office